(12) United States Patent
So

(10) Patent No.: US 7,460,282 B2
(45) Date of Patent: Dec. 2, 2008

(54) DYNAMIC PATTERN GENERATION FOR OPTICAL SIGNAL PROCESSING

(75) Inventor: John Ling Wing So, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1455 days.

(21) Appl. No.: 10/426,432

(22) Filed: Apr. 30, 2003

(65) Prior Publication Data

US 2003/0231365 A1 Dec. 18, 2003

Related U.S. Application Data

(60) Provisional application No. 60/376,594, filed on Apr. 30, 2002.

(51) Int. Cl.
*H04N 1/46* (2006.01)
*G02B 26/08* (2006.01)
*G03C 5/04* (2006.01)

(52) U.S. Cl. ........................ 358/509; 358/512; 359/298; 430/396

(58) Field of Classification Search ................. 358/509, 358/512; 359/298, 223, 443; 430/396
See application file for complete search history.

(56) References Cited

U.S. PATENT DOCUMENTS

| 5,930,027 | A * | 7/1999 | Mentzer et al. | 359/298 |
|---|---|---|---|---|
| 6,238,852 | B1 * | 5/2001 | Klosner | 430/396 |
| 6,857,746 | B2 * | 2/2005 | Dyner | 353/28 |
| 2003/0001953 | A1 | 1/2003 | Rancuret et al. | |

* cited by examiner

*Primary Examiner*—Houshang Safaipour
(74) *Attorney, Agent, or Firm*—Charles A. Brill; Wade J. Brady, III; Frederick J. Telecky, Jr.

(57) ABSTRACT

A processor such as a digital signal processor (DSP) is used to dynamically generate patterns and/or sequences of patterns for a spatial light modulator (SLM), such as a micromirror device, for the purpose of processing light. The combination of the processor and modulator has afforded optical signal processing in the digital domain and programmability that cannot be achieved with conventional analog optical computing.

1 Claim, 10 Drawing Sheets

CO-CHANNEL MODULATION #1

CO-CHANNEL MODULATION #2

ALL MICROMIRRORS ARE ON

ALL MICROMIRRORS ARE ON

FIG. 16
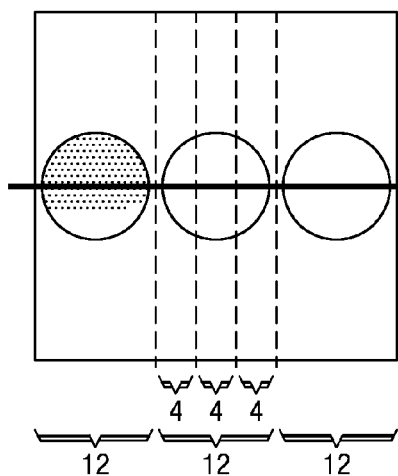
FIG. 19a
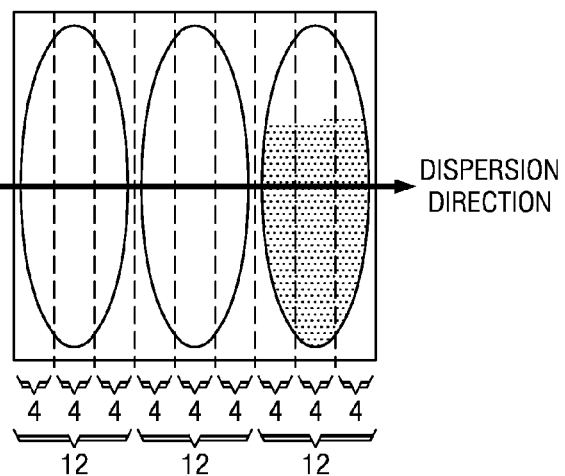
FIG. 19b

US 7,460,282 B2

DYNAMIC PATTERN GENERATION FOR OPTICAL SIGNAL PROCESSING

This application claims priority under 35 U.S.C. § 119(e)(1) of provisional application No. 60/376,594 filed Apr. 30, 2002.

FIELD OF THE INVENTION

This invention relates to the field of optical signal processing, more particularly to pattern generation for optical signal processing using spatial light modulators.

BACKGROUND OF THE INVENTION

Modern optical signal processors utilize fixed filters. With the advent of micromirror devices and other spatial light modulators, dynamic optical filters have become possible. What is needed is a way to drive the spatial light modulator with dynamic patterns to create dynamic, reconfigurable filters.

SUMMARY OF THE INVENTION

According to one embodiment of the present invention, processor such as a digital signal processor (DSP) is used to dynamically generate patterns and/or sequences of patterns for a spatial light modulator (SLM), such as a micromirror device, for the purpose of processing light. The combination of the processor and modulator has afforded optical signal processing in the digital domain and programmability that cannot be achieved with conventional analog optical computing.

The methods and systems disclosed herein are further applicable to pattern generation on any display devices e.g. graphics monitor s and LCD (Liquid Crystal Display) panels or SLMs (Spatial Light Modulators). The algorithms employed make it possible to generate two-dimensional patterns with microprocessors with one-dimensional memory array or linearly addressed storage. Although a DSP is best suited for implementing the algorithms in this invention, other processing elements, microprocessors and/or microcontroller can also be used.

When used in an adaptive manner, in response to an external stimulus representing change, the invention allows adaptive dynamic patttern generation for applications such as ADOF (adaptive dynamic optical filters), AOA (adaptive optical amplifier) control, light intensity monitoring devices, dispersion compensation modules, polarization mode dispersion compensation mdoules, optical switching and routing etc. in the DWDM (dense wavelength division multiplexing) optical communciation market.

BRIEF DESCRIPTION OF THE DRAWINGS

For a more complete understanding of the present invention, and the advantages thereof, reference is now made to the following descriptions taken in conjunction with the accompanying drawings, in which:

FIG. 16 is an illustration of a bit map configured as 320 spectral columns each having a height of 208 pixels.

FIG. 19 is an illustration showing the spot size of light spots staying centered on the dispersion axis.

DETAILED DESCRIPTION OF THE PREFERRED EMBODIMENTS

According to one embodiment of the present invention, processor such as a digital signal processor (DSP) is used to dynamically generate patterns and/or sequences of patterns for a spatial light modulator (SLM), such as a micromirror device, for the purpose of processing light. The combination of the processor and modulator has afforded optical signal processing in the digital domain and programmability that cannot be achieved with conventional analog optical computing.

The methods and systems disclosed hereing are further applicable to pattern generation on any display devices e.g. graphics monitor s and LCD (Liquid Crystal Display) panels or SLMs (Spatial Light Modulators). The algorithms employed make it possible to generate two-dimensional patterns with microprocessors with one-dimensional memory array or linearly addressed storage. Although a DSP is best suited for implementing the algorithms in this invention, other processing elements, microprocessors and/or microcontroller can also be used.

When used in an adaptive manner, in response to an external stimulus representing change, the invention allows adaptive dynamic patttern generation for applications such as ADOF (adaptive dynamic optical filters), AOA (adaptive optical amplifier) control, light intensity monitoring devices, dispersion compensation modules, polarization mode dispersion compensation mdoules, optical switching and routing etc. in the DWDM (dense wavelength division multiplexing) optical communciation market Texas Instruments' digital micromirror device (DMD) technology is fully digital and programmable. A DMD is comprised of a two-dimensional array of micromirrors, each exercisable into the ON or OFF state. As such a DMD is programmable under software control to provide resolution that can be re-configured on-the-fly to increase or decrease the spatial sampling resolution of different light sources such as spatially dispersed wavelengths of light (e.g. DWDM channels dispersed using a grating or prism).

The spot size of an individual lambda or wavelength can cover a group of micromirrors on the DMD and it is the organization of these groups of micromirrors and their variable patterns that distinguish one application from another. For example, if one organizes the area under the spot size of a wavelength into a segment of H (height) rows and W (width) columns of micromirrors, then by decreasing the number of ON-state micromirrors, the light intensity reflected off of the segment of micromirrors will be diminished accordingly. Conversely, by increasing the number of ON-state micromirrors, the intensity of the reflected light will gradually return to it previous level.

Figure 1:
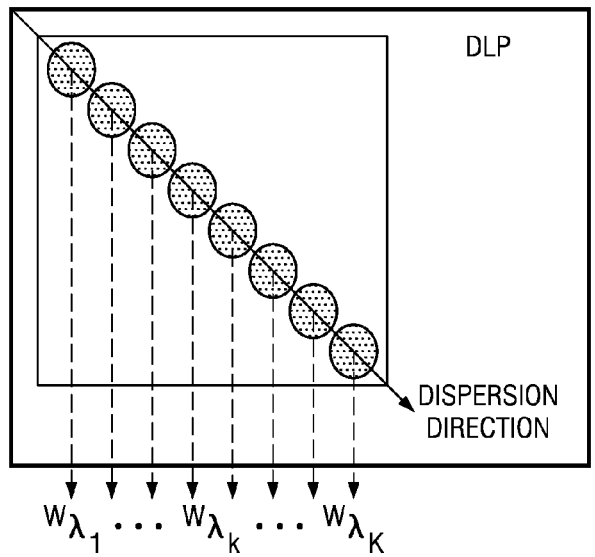
FIG. 1 is a plan view of a portion of a spatial light modulator array showing the distribution of a series of light spots, each of a unique wavelength, focused into a series of light spots across the diagonal of the spatial light modulator array.

Assuming a DMD 102 of size H rows by W columns and the dispersion direction of the DWDM spectrum is along its diagonal 104, FIG. 1 shows K spatially dispersed wavelength beams 106 $\{\Omega_1, \ldots \Omega_k \ldots \Omega_K\}$, each fully resolved and covering an area of $h_k$ by $w_k$ micromirrors (pixels). Note that the maximum height of a segment in this case is H and the maximum width is W while the segment size for the spot size shown is $h_k$ by $w_k$ micromirrors (pixels).

Figure 2A:
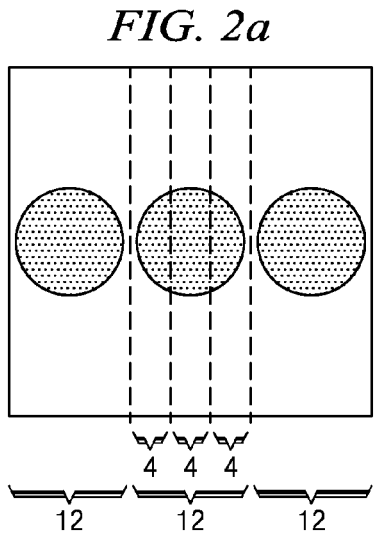
FIG. 2a is a plan view of a spatial light modulator array showing three wavelength spots focused as round spots in a horizontal dispersion direction.

For example, the FIG. 2a shows three dispersed wavelength spots on segments of size ($h_k$=12, $w_k$=12) each. Instead of manipulating a wavelength with a single segment of $h_k$ by $w_k$ micromirrors, more control resolution can be achieved by sub-dividing the spot size into smaller segments of size, say, $h_k$=12 and $w_k$=4—smaller groups of micromirrors of two rows and 4 columns each.

Correspondingly, the resultant spatial sampling resolution has increased by a factor of 3 in this example since the individual wavelengths can now be manipulated independently with three individual segments. In the extreme case, each of the W columns of the DMD can be regarded as a spectral line in the spatial domain and a segment can be organized in a x1 configuration, thereby yielding the highest spectral sampling resolution. In this case, the resolution of the single column would be equal to the maximum row count or H and the maximum number of single column segment is W for a H×W DMD array.

Figure 2B:
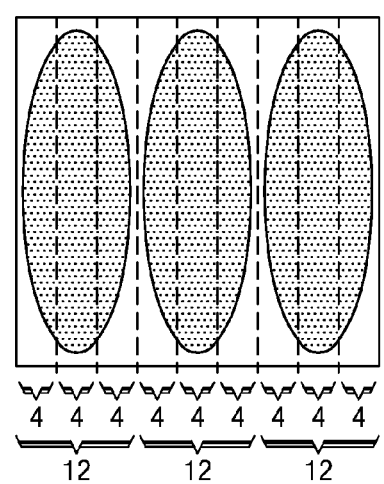
FIG. 2b is a plan view of a spatial light modulator array showing three wavelength spots focused as vertically elongated spots in a horizontal dispersion direction.

Further manipulations of the micromirrors of the DMD are possible. For example, instead of aligning the wavelength dispersion direction along the diagonal of the DMD (due to mirror hinge orientation at 45 degrees), FIG. 2b shows arbitrary orientation of the dispersed lambda's in the same horizontal orientation. With a slightly different optical designs, for example using an elliptical fold mirror or cylindrical lens, the beam size can be made more spread out in the direction orthogonal to that of dispersion while the same intensity can be afforded to each subgroup by increasing $h_k$ by a factor of 3—$h_k$=36 as shown in FIG. 2b.

By using Texas Instruments' DMD technology for Dynamic Optical Filtering, the spatial sampling resolution of the optical filter can be increased by simply re-configuring the flexible DMD on the fly. The pattern generation for the DMD is performed by a Texas Instruments high-speed DSP. The combination of the high-speed, high-precision of both the DSP microcontroller and DMD has proven to be critical for a successful implementation of applications such as an Adaptive Dynamic Optical Filter (ADOF).

The following figures show the spatial beam mapping of the demultiplexed lambda's (wavelengths or channels) to the spectral mapping on the R×C DMD™ device. The example depicts an arbitrary spatially sample of the demultiplexed beams by 12 individual columns, each one acts as a resultant spectral line with magnitude and phase characteristics.

Figure 3:
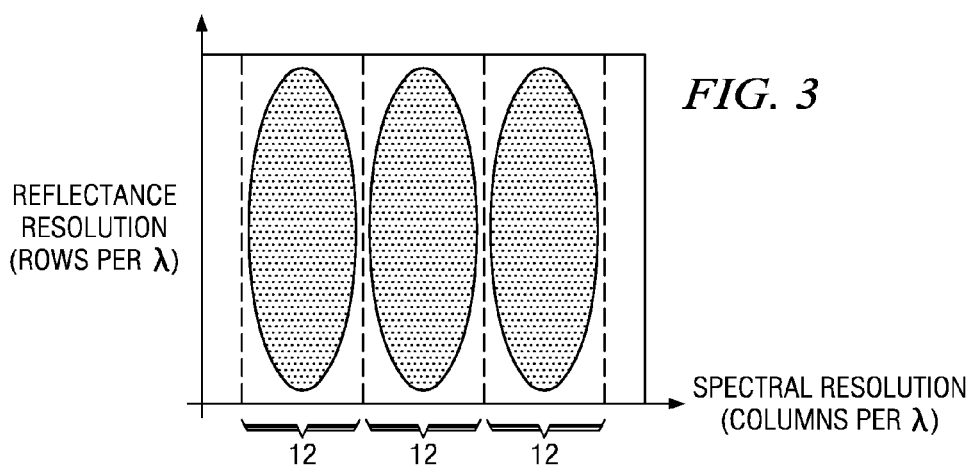
FIG. 3 is a plan view of a portion of a spatial light modulator illustrating the relationship of reflectance resolution and spectral resolution as the spatial light modulator array size increases.
Figure 4:
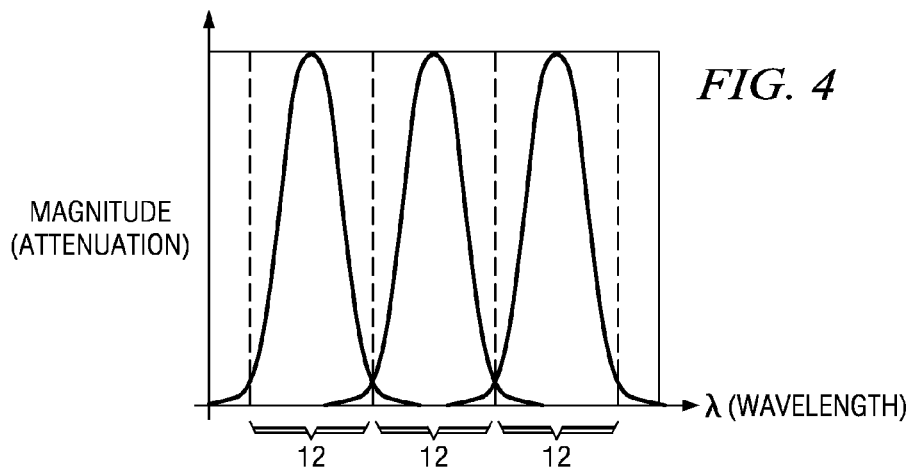
FIG. 4 is a plan view of a portion of a spatial light modulator array superimposed on a graph showing the magnitude of three signals versus wavelength.
Figure 5:
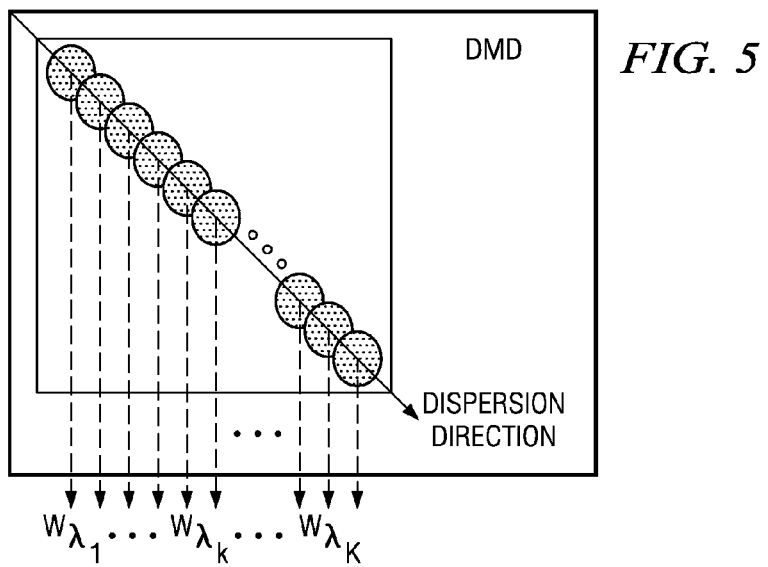
FIG. 5 is a plan view of a portion of a spatial light modulator showing the diagonal dispersion of various light spots that are not completely resolved.

Spectrally, the optical spectrum is sampled with the highest possible resolution on the DMD i.e. one column's worth of spectral resolution in nanometers (nm) of wavelength. In general, the following rules apply:

1. Number of rows per λ affects reflectance (see FIG. 3).
2. Number of columns per λ affects spectral resolution (see FIG. 3).
3. Resultant number of micromirror or modulator elements (steps), affects attenuation resolution (see FIG. 4).

Further grouping of the wavelengths are possible. For example, in the metro DWDM market, instead of manipulating wavelengths one at a time, very often, wavelengths are grouped together as a band that are manipulated as a group by a single segment of micromirrors. Depending on the actual application, some overlapping of the dispersed wavelengths (lambda's) are allowed as shown below. For example an 80-channel DWDM dynamic optical filter can be achieved by carefully overlapping the lambda's along the dispersion direction as they are dispersed by a dispersive element. For purposes of illustration, but not as a limitation, a dispersive element may include a grating, a prism, or any other optical component including refractive, reflective, and diffractive elements.

Figure 6A:
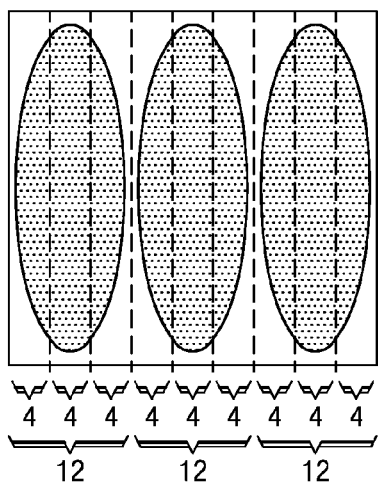
FIG. 6a is a plan view of a portion of a spatial light modulator showing three completely resolved light spots, each 12 modulator elements wide.
Figure 6B:
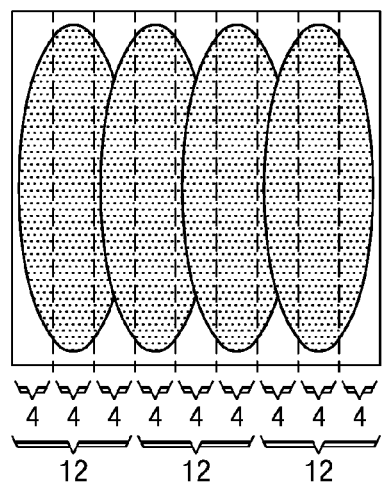
FIG. 6b is a plan view of a portion of a spatial light modulator showing three partially resolved light spots, each 12 modulator elements wide.

For example, FIG. 6a in the diagram below shows three dispersed wavelength spots on segments of size ($h_k$=12, $w_k$=12) each. Instead of manipulating a wavelength with a single segment of $h_k$ by $w_k$ micromirrors, more control resolution can be achieved by sub-dividing the spot size into smaller segments of size, say, $h_k$=12 and $w_k$=4—smaller groups of micromirrors of two rows and 4 columns each. In FIG. 6b, however, the adjacent wavelengths are overlapped i.e. the beams have overlapping spot sizes. With overlapping wavelengths, the system requirement on the actual dispersion device (for example a grating) is much relaxed since the wavelengths do not have to be fully resolved. At the same time, this has the effect of lowering the cost and precision fo the grating used for an overlapped implementation.

As discussed before, the resultant spatial sampling resolution has also increased by a factor of 3 in this example since the individual wavelengths can now be manipulated independently with three individual segments. In the extreme case, each of the W columns of the DMD can be regarded as a spectral line in the spatial domain and a segment can be organized in a x1 configuration, thereby yielding the highest spectral sampling resolution. In this case, the resolution of the single column would be equal to the maximum row count or H and the maximum number of single column segment is W for a H×W DMD array.

Further manipulations of the micromirrors of the DMD are possible. For example, instead of aligning the wavelength dispersion direction along the diagonal of the DMD (due to mirror hinge orientation at 45 degrees), the diagram below has shown arbitrary orientation of the dispersed lambda's in the same horizontal orientation.

With a slightly different optical designs, for example using an elliptical fold mirror or cylindrical lens, the beam size can be made more spread out in the direction orthogonal to that of dispersion while the same intensity can be afforded to each subgroup by increasing $h_k$ by a factor of 3 i.e. $h_k=36$ as shown below.

When using an overlapped scheme, bear in mind that some pixels now have adjacent lambda's or wavelengths overlapped. Hence manipulation of such overlapped pixels will have simultaneous effect on both the current wavelength and it's neighbors.

In summary, the dispersed light beams can be spatially displayed on the DMD in any direction. The dispersed light beams typically are spread either along the diagonal, in either the direction of the hinges or perpendicular to the hinges of the micromirrors, or horizontally along the row direction. Without loss of generality, this discussion will concentrate on the horizontal row direction of spatially dispersing the DWDM wavelengths in the description of the pattern generation algorithms. If a 45-degree rotation is needed, one can implement that in software or hardware as the system requirement dictates. The tends to be closely related to the system optical and mechanical designs and will not be discussed in the present context of pattern generation.

Processing the Optical Spectrum:

Introduction:

Currently the optical spectrum for DWDM can be classified into a number of wavelength bands which rough spans the entire optical spectrum of 1260 to 1674 nm (nanometer) as shown in Table 1.

TABLE 1

| Optical Spectrum | | |
|---|---|---|
| BAND | DESCRIPTOR | RANGE (nm) |
| O - BAND | ORIGINAL | 1260~1360 |
| E - BAND | EXTENDED | 1360~1460 |
| S - BAND | SHORT-WAVELENGTH | 1460~1530 |
| C - BAND | CONVENTION | 1530~1565 |
| L - BAND | LONG-WAVELENGTH | 1565~1625 |
| U - BAND | ULTRA-LONG WAVELENGTH | 1625~1675 |

The above band ranges are for the purpose of discussion only and not to be taken as the ITU (International Telecommunication Union) specifications for optical communication. For each of these proposed spectral band, the entire band of interest can be operated upon with a Texas Instruments DMD using Texas Instruments DSP technology for pattern generation.

Pattern Generation for Optical Signal Processing

Figure 7:
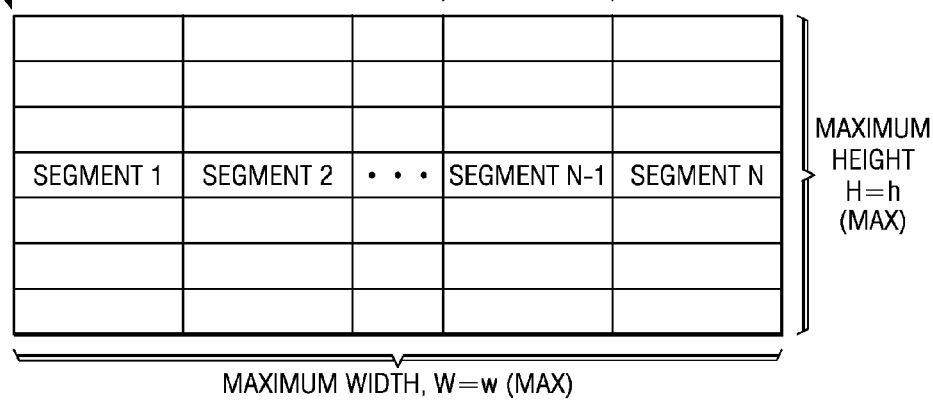
FIG. 7 is a plan view of a portion of a spatial light modulator showing the division of the spatial light modulator into a series of independent segments.
Figure 8:
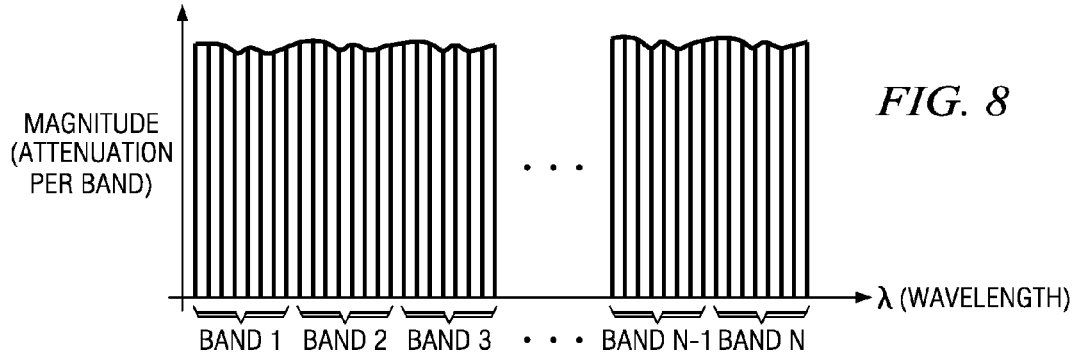
FIG. 8 is a plot of a multi-wavelength banding filtering technique.
Figure 9:
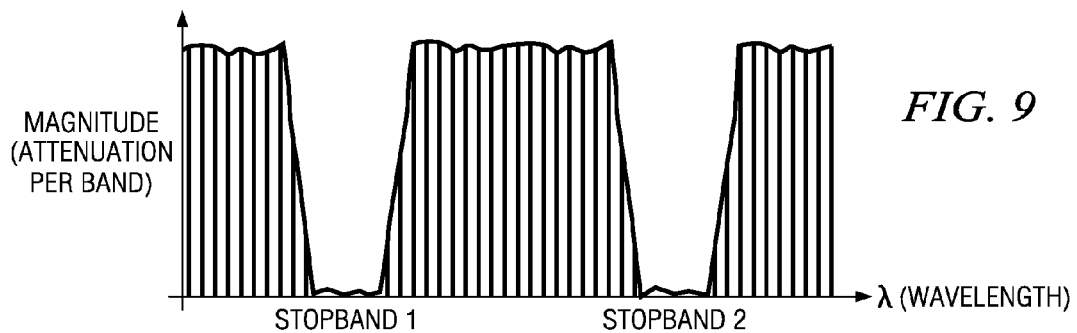
FIG. 9 is a plot of the response of a multi-band drop filter.
Figure 10:
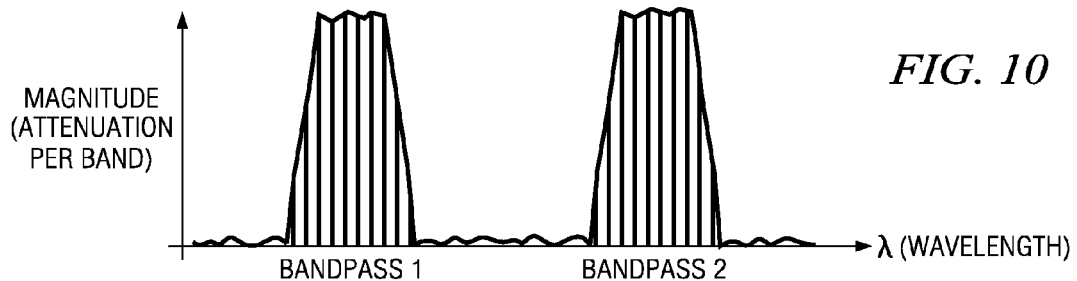
FIG. 10 is a plot of the response of a multi-band select filter.
Figure 11:
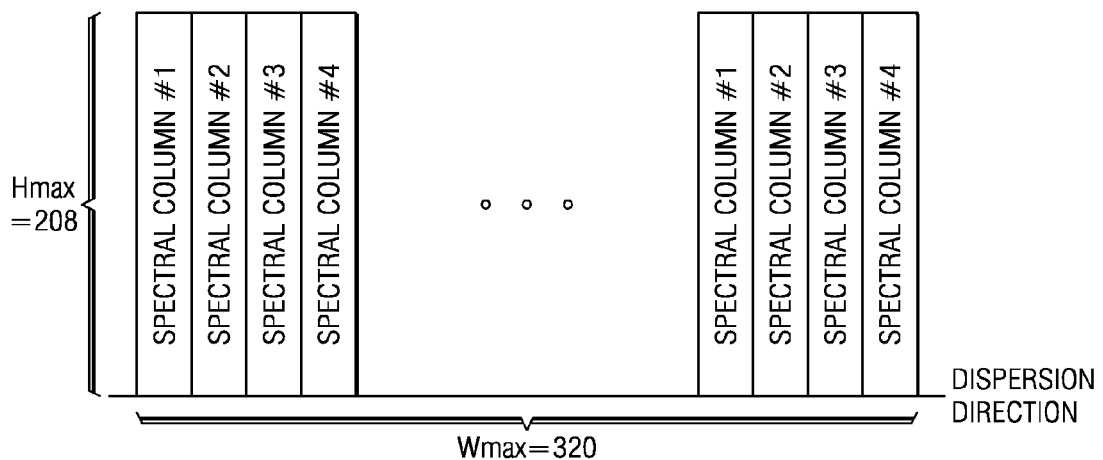
FIG. 11 is an illustration showing a series of segments.

Texas Instruments' DMD based Adaptive Dynamic Pattern Generation for optical signal processing can be conceptually visualized as sub-dividing the entire optical band (e.g. the C or L band) into a number of segments (a total of N) each having a variable height h and width w as shown in FIG. 7.

For discussion purposes, the maximum allowed height in each implementation is H and the maximum allowed width is W as shown. These N segments covers the entire span of the spatially dispersed DWDM channels (wavelengths) on the DMD. The spatial dispersion being performed with a grating as an example.

Each segment therefore comprises a total of (h×w) micromirrors, each can be operated upon with a suitable algorithm to generate a series of patterns (e.g. a double-crescent pattern described later) for the purpose of turning ON of OFF the number of micromirrors allocated for that segment. By turning ON and OFF these micromirrors, the segment of spatially dispersed light can be manipulated for variable magnitude and phase changes.

Each filter band in a multi-band filter can be covered by multiple segments such that N segments can be individually tailored and operated upon for a multi-band filter of N channels. Each filter band or channel therefore corresponds to a segment of micromirrors on the DMD device. Each segment has a height of h micromirrors and h can vary from 1 to H where H is the maximum value of h in any given implementation. Likewise, each segment has a width of w micromirrors and N such segments, each of which may be of unequal width, shall make up the maximum width W of micromirrors on the DMD device as shown above.

A typical Texas Instruments DMD has a resolution of 1024×768 pixels. Therefore, both the C and L bands in the optical spectrum can be easily accommodated. Conceptually, each of the N segments for each of the C or L band, is comprised of h rows and w columns. Rows and columns are interchangeable depending on the optical orientation and design of the optical system.

Many applications can be achieved with a suitable pattern generation al;gorithm or a combination of algorithms for adaptive dynamic optical signal processing. For example, by sub-dividing the spectral band of interest into a number of filter bands or sub-bands, a multi-band filter can be implemented across the entire spectral band (e.g. the C or L band). Such a technique is called multi-wavelength banding. A multi-band filter can therefore be implemented for dynamic spectral gain/equalization applications. Similarly, a multi-band-drop or band-select filter can therefore be implemented for ADD/DROP multiplexing applications.

By utilizing a dither-map, further optical signal processing can be performed to produce further out-of-band or stopband attenuation. This is due to the fact that each tiny pixel or micromirror is in a way an optical phasor illuminated with coherent DWDM light channels. Suitably constructed diffraction patterns can be produced to enhance optical attenuation for more out-of-band rejection. These patterns are superimposed on the regular attention phasor patterns, for example a double-crescent patttern, for further out-of-band rejection.

By utilizing a suitable optical design whereby the spot sizes of the DWDM channels are elongated in a direction orthogonal to the dispersion direction, the outlying pixels can further be utilized for dithering with a suitable dither-map or for Co-channel Modulation where a slow frequency modulation is superimposed on each of the DWDM channel to carry channel identification, routing and other control information.

By utilizing a dither-map, further optical signal processing such as optical masking and pattern generation for a "super-step" for coarse segment signal attenuation can be achieved as discussed later.

Segment Processing:

Introduction

A typical Texas Instruments DMD has a resolution of 1024×768 pixels. Therefore, both the C and L bands in the optical spectrum can be easily accommodated. Conceptually, each of the N segments for each of the C or L band, is comprised of h rows and w columns. Each segment therefore comprises a total of (h×w) micromirrors and each micromirror or pixel can be operated upon with a suitable algorithm to generate a series of patterns of ON and OFF of micromirrors for the purpose of manipulating the magnitude and phase response of the optical segment.

Segment Processing Therefore Entails:

Segment Organization: The organization of each segment in the optical band into h rows and w columns of micromirrors in accordance to a given optical signal processing application, algorithm(s) and optical design e.g. spot size, optical lens, mirror and focal length etc. In some optical designs, the spot size is often elongated to become elliptical and shown as a rectangular spectral column in the figure above for a spectral band subdivided into 320 spectral columns (Wmax=320).

Segment Building Block: A spectral column is used as the building block for a larger segment. As such a spectral column is a segment of width w=1 and a maximum height h=208 (Hmax). For example, the first left-hand-side segment is of width w=2 and has a maximum allowed height of 208 giving a maximum number of pixels per pattern as 2×208=416. The right-most segment remains just 1 spectral column wide such that one can obviously tailor the size of each segment to the size of the spatially dispersed DWDM wavelength spot size for adequate coverage.

Variable Height/Width: To satisfy a large number of optical signal processing applications, the height h and width w of each segment should be individually variable to suit the optical signal processing algorithm and the optical design. For example, the spot sizes of the individual DWDM channels or wavelengths dispersed by a grating are not uniform.

Pattern Generation: Each application would require some kind of a pattern generation algorithm to manipulate each segment of micromirrors for optical signal processing. This may be a spiral pattern (described in a separate patent filing) or a double-crescent pattern generation algorithm shown by the two "grayed out" crescent-shaped set of pixels shown adjacent (immediately above and below) to the center two rows of always-ON pixels in a figure in the next section.

Center-Clipping: An algorithm that requires a double-crescent pattern generator to preserve the intensity distribution at the center of a spot size such that the center rows of each light beam segment are undisturbed. The figure in the next section shows an example of center clipping a segment i.e. spot size by two rows of always-ON pixels. Depending on the height of the segment, more center rows can be "clipped" i.e. left always ON.

Self-Centering: Since the signal strength/spot size of a DWDM channel can change, a self-centering algorithm of the pattern generated is required so that the signal is always centered along the direction of dispersion (e.g. by a grating) of the DWDM channels or wavelengths. This is also required when the height of a segment is varied between its maximum and minimum value.

Dither-Map & Anti-Aliasing: A Dither-Map is a means used to overlay an optical mask with a specific pattern on a segment of micromirrors for each DWDM channel to manipulate its magnitude and phase response. Such an optical mask can also be used to "dither" selected micromirrors with a pre-determined ON or OFF pattern. An example dither map is shown in a figure in the next section as a row of periodic cross-hatched pixels ($4^{th}$ row from the bottom of the segment) to further manipulate the resultant phase and magnitude response of each segment of micromirrors. This is often needed in an Optical Add/Drop Multiplexer (OADM) application to achieve more out-of-band rejection or optical signal attenuation. As such, a dither-map can also used for anti-aliasing adjacent DWDM channels in an optical spectrum.

Co-Channel Modulation: Another use of a dither map is to generate a Co-Channel Modulation for carrying control, switching and identification information by the same DWDM carrier which carries the primary channel data. Co-channel modulation can also be used to perform optical channel/performance monitoring of each DWDM channel by monitoring the status of the co-channel-modulation of each channel. The modulation is produced by toggling some of the outlying micromirrors in each segment from frame to frame (each frame is a bitmap on the DMD). The frame update rate is essentially the modulation rate.

Figure 12:
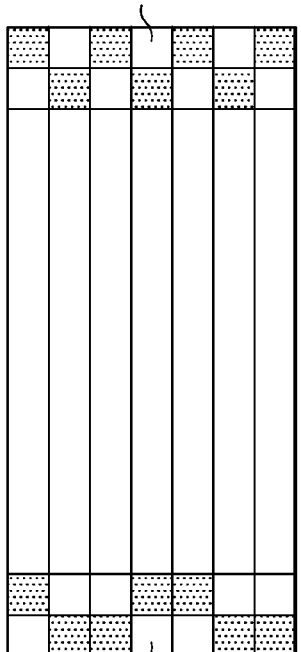
FIG. 12 is an illustration showing co-channel modulation superimposed on a DWDM channel.
Figure 13:
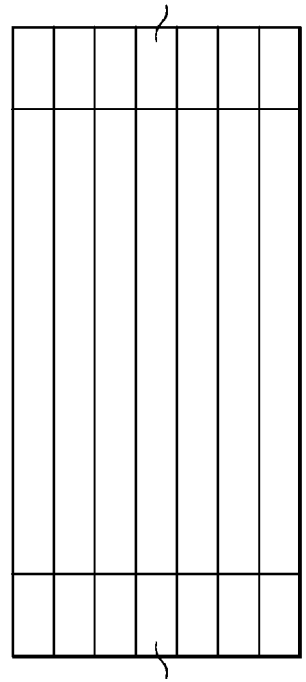
FIG. 13 is an illustration showing co-channel modulation superimposed on a DWDM channel.

This is shown in FIGS. 12 and 13. In FIG. 12, frame N has some pixels turned OFF and turned back ON in frame N+1 of FIG. 13.

Figure 14:
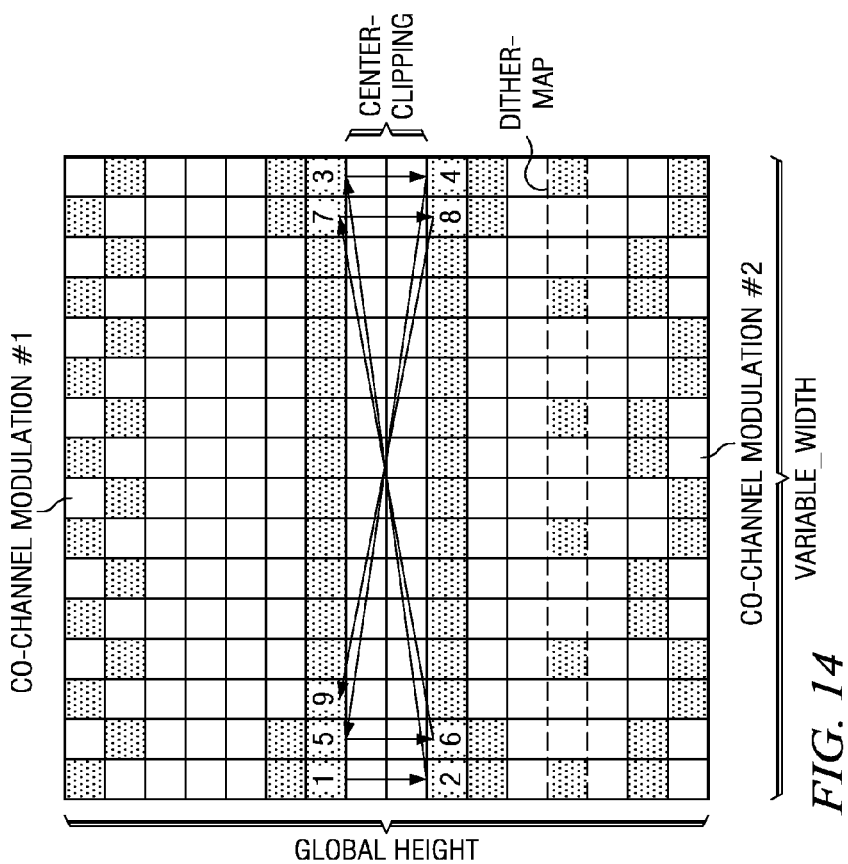
FIG. 14 is an illustration of co-channel modulation and center clipping.

Co-Channel modulation can be superimposed on a DWDM channel by applying an optical mask (e.g. a dither-map) that operates on a band of outlying pixels (for example as shown in FIG. 14 as the top 2 rows and bottom 2 rows of a segment) of the spot size of a DWDM channel.

Pattern Generation Algorithm for Height×Width (h×w)

Figure 15:
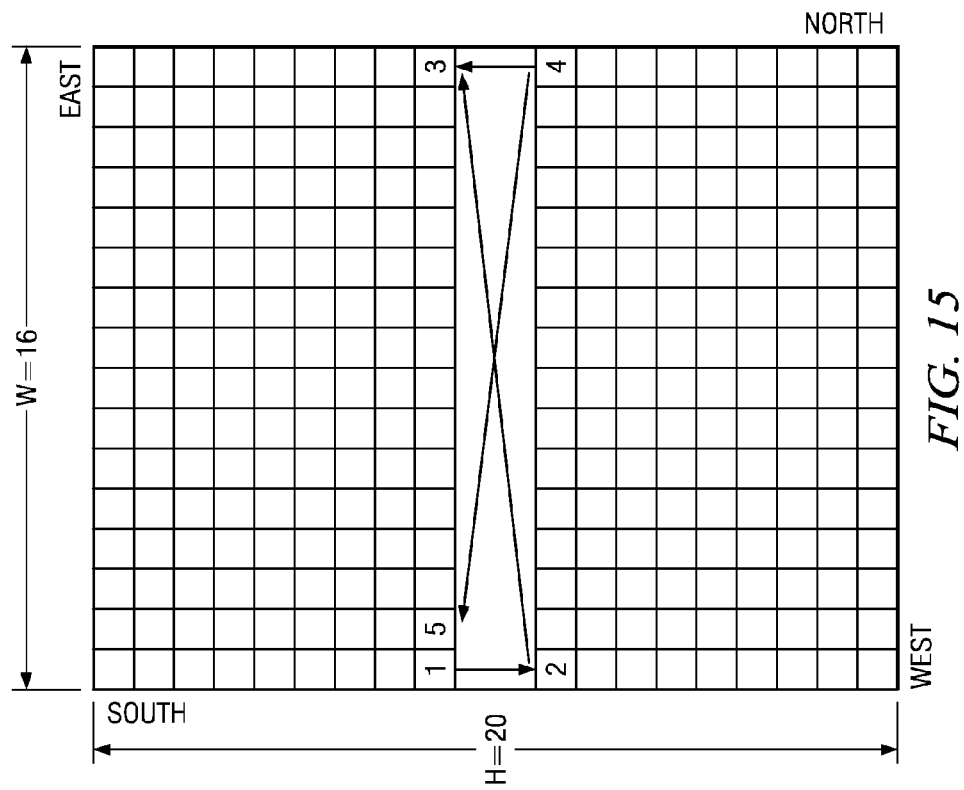
FIG. 15 is an illustration of a bit map for a pattern generation algorithm.

In general, any pattern generation algorithm begins with a way to fill a bitmap of the size h by w where the maximum value of height H is Hmax=208 in a previous spectral column example. Maximum value of width W is Wmax=320. Variables h={1, . . . ,H}, w={1, . . . ,W} where h is segment height and w is segment width. The total width of N segments=W. The example below shows a segment with a height of 20 and a width of 16 pixels with a center-clipping or two rows of always ON micromirrors. The Double-Crescent pattern generation steps are illustrated for the first 5 steps. Step 1 starts on the left side of the center clipping rows while transitioning to Step 2 on the other side of the two center rows. Then Step 3 is diagonally opposed to Step 2 on the right hand side of the segment. Step 4 is on the other side of the two center rows and will transition diagonally to Step 5 with has one pixel adjacent to Step 1. The number of pixels turned OFF per step is the same as the step number itself. For Step 5, 5 pixels are turned OFF in the positions shown in FIG. 15. Each step also reduces the intensity distribution of the DWDM beam. The channel spot size is assumed to maximally occupy the segment micromirrors in illumination area.

In an implementation with a DSP, the variables h and w are passed to the DSP during runtime which configures and packs the segment maps to fill the entire band memory for the N segments (channels). Each segment has a total of n steps and step_n is passed to the DSP to generate the step_n pattern. The DSP computes and fills the N segment bitmaps in its memory in accordance to a given sequencing map.

Bit Packing for Optical Band Memory with N Segments

FIG. 16 shows a typical C or L optical band configured as 320 spectral columns each of height 208 pixels. A portion of the DSP system memory is dedicated to storing the optical band bitmap for output to the DMD. Each bitmap of optical band is packed in memory by columns i.e. one column at a time from left to right (column 0 to column w) for each segment until N segments are done or a total of 320 columns in all. Start packing each column from the bottom i.e. bit 0 (lsb) of WORD 0 all the way to a maximum of 208 bits or WORD 12.

High-speed Pattern Generation Implementation Issues

Segment processing entails the generation of a desired step pattern on the DMD for each variable size segment in the spectral band of interest. Each individual segment in the spectral band can be of variable width w and height h.

Two obvious approaches come to mind quickly easy implementation: (1) LUT approach—for a single spectral column of fixed height h=208 (i.e. 208 steps), a LUT size of approximately 5.5K bytes are needed. For a fixed size segment of 16×208, the LUT size is ~86.5K bytes! Since a different LUT is needed for each variable width or height setting, the total LUT size is very large and often beyond the addressing range of a processor for example, for vary height between 1~208, 208 different LUTs of maximum size 5.5K bytes are required. (2) Computations—Although the previously described algorithm has been implemented in software (for example using C code as previously described) the resultant implementing a spiral segment of variable width (up to 16) and variable height (up to 256) is quite inadequate for real-time applications. For example to generated all the segments of width w=1 for individual spectral columns covering the entire DWDM C-band was in tens of milliseconds (ms). One can also optimize the C code or write assembly DSP code or even resort to running the code in a much faster DSP. For a given DSP, however, there has to be a better algorithm for high-speed pattern generation implementation for segment processing.

Obviously, neither the LUT nor the computational approach is not satisfactory for real-time applications which need both speed and compact code! Without loss of generality, we will use the above example of Wmax=320 and Hmax=208 to discuss our high-speed segment pattern generation algorithm and its implementation, bearing in mind that the it is applicable to a variable size segment of any Wmax and Hmax.

A Novel Companding Algorithm for Pattern Generation

Our implementation calls for speed (~30 DSP clocks on the Texas Instruments 320c5416 DSP for example, 200 ns per spectral column) in generating the attenuation step patterns. Code space is also a premium therefore LUT sizes described above are not acceptable.

For speed reasons, a combination of table-lookup and computational techniques are used to implement the high-speed pattern generation algorithm using a novel 32-bit companding algorithm which quickly generates all the possible step patterns (up to 208) for each spectral column.

Pattern generation for larger segments using the spectral column as a building block can further be computed by noting the relationship of a segment step pattern and a spectral column step pattern. The algorithm for computing such a relationship will be described later. We will describe the companding algorithm used to implement a spectral column as a building block next.

The novel 32-bit companding algorithm for generating step patterns of a spectral column uses a multi-section companding algorithm where each section is further sub-divided into multiple 32-bit subsections for high-speed 32-bit table-lookup operations as described below.

The novel 32-bit companding algorithm for generating step patterns of a spectral column is applicable to any height h and width w. When height changes, a different number of sections and sub-sections will be used. For example, a height h=256 may use a 5 section/8 subsection or 5/8 companding algorithm.

Figure 17:
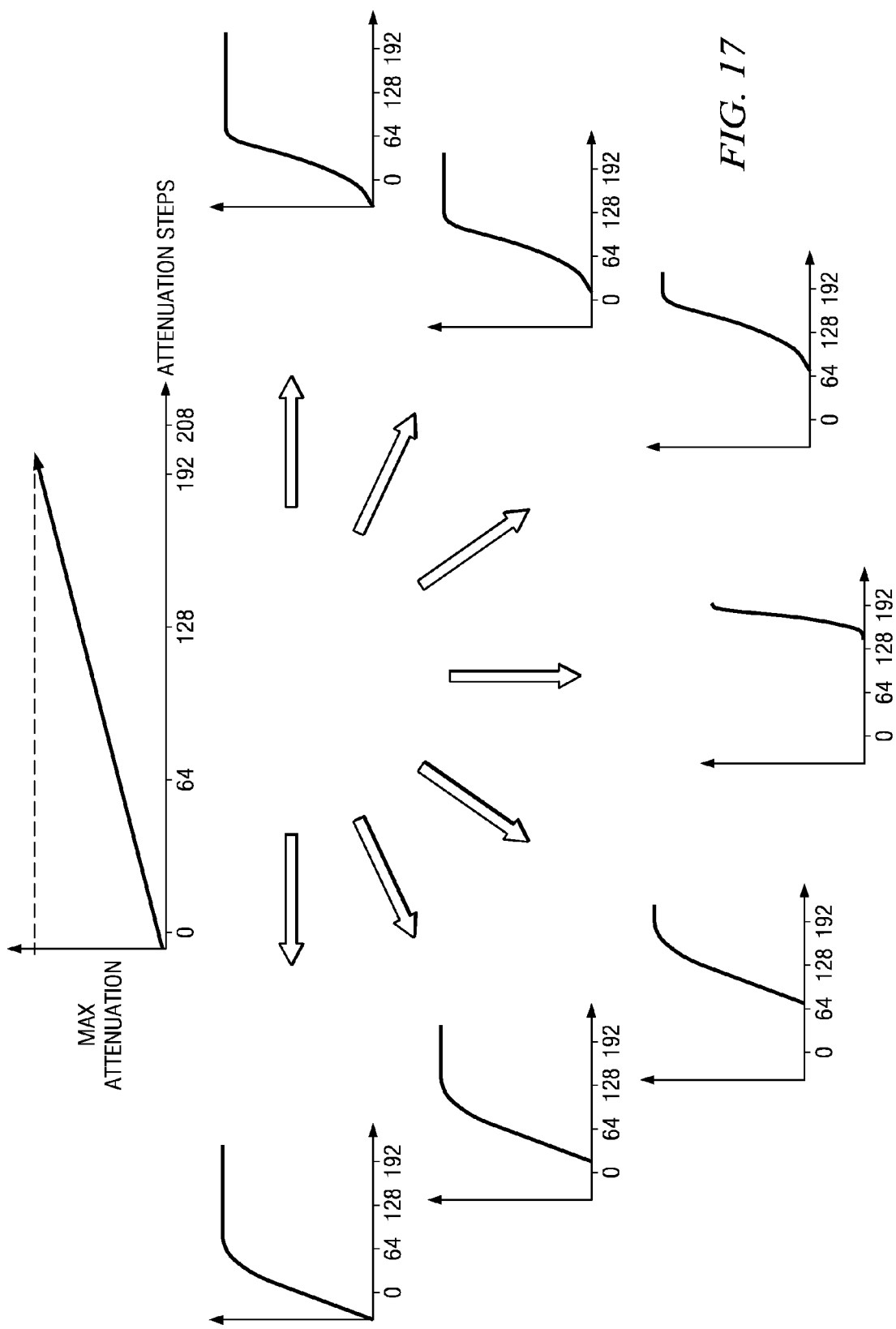
FIG. 17 is an illustration of segment companding.

For a building block of a spectral column (208 pixels), a 4/7 companding algorithm (4-sections/7-subsections) is used and implemented with 32-bit table lookup operations as shown in FIG. 17.

Figure 18:
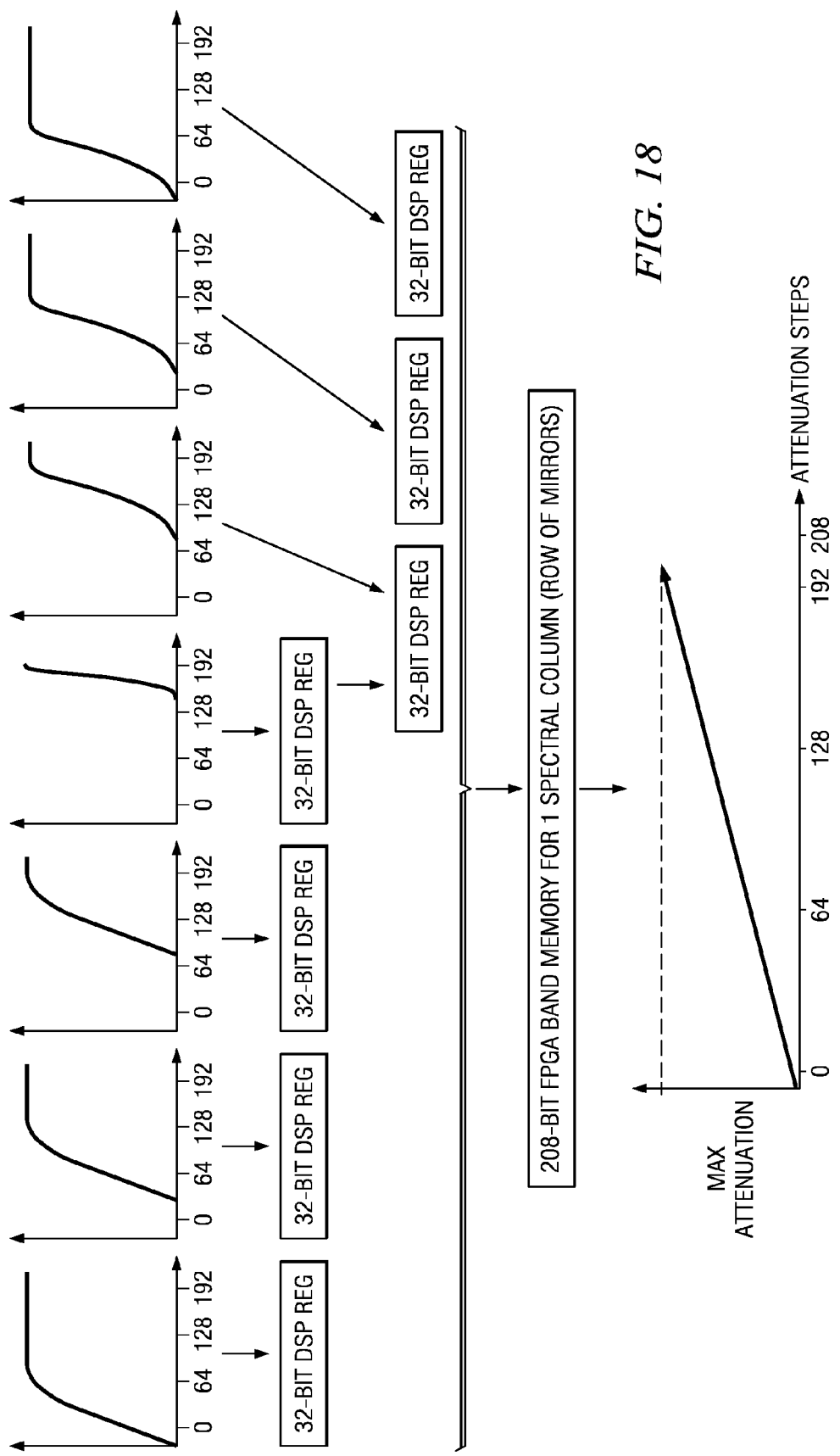
FIG. 18 is an illustration of step pattern re-combination.

For a spectral column of 208 pixels, 208 step patterns are possible each is a vector of 208 pixels. Each section (or group of vectors) is further sub-divided into 7 subsections (or sub-groups) of 32-bit sub-vectors for 32-bit table lookup operations are shown in FIG. 18.

A 4/7 companding algorithm divides these 208 vectors, each of 208 pixels into 4 group or sections, each addressable by table-lookup using its constituent step number. In principle a total of 4 section LUTs will be required for the 4/7 companding algorithm but our high-speed implementation uses far less LUTs to conserve code space as described later.

For a spectral column of 208 pixels, 208 step patterns are possible each is a vector of 208 pixels. A 208-pixel vector will be further sub-divided into 7 sub-sections each implemented with a 32-bit sub-vector addressable from a sub-section LUT. In principle a total of 7 sub-section LUTs will be required for the 4/7 companding algorithm but our high-speed implementation uses far less LUTs to conserve code space as described later.

The novel 32-bit companding algorithm for generating step patterns of a spectral column then re-combines the seven 32-bit sub-vectors back into a single 208-pixel vector which makes up a segment step pattern of 208 pixels. The re-combination is application of any multiple section/subsection companding scheme.

A 208-pixel vector will not easily fit 7 sub-sections implemented with 32-bit sub-vectors. To maintain high-speed 32-bit operations throughout, however, the middle 16-bit sub-section is implementation as a 32-bit sub-section by padding the 16-bit sub-vectors (with 16 trailing 0's) into full up 32-bit sub-vectors for 32-bit table lookup operations.

During the table-lookup of a vector of 208 pixels, an addressing scheme is used such that the middle "zero-padded" sub-section and the next 32-bit sub-section will be overlapped in the re-combination of the 7 sub-vectors as shown in FIG. 18. The overlap is of length 16 bits and will not affect the re-combination of the two 32-bit sub-vectors. The following figure shows the overlapping and re-combination used in the 4/7 companding algorithm in forming the resultant 208 vector for each segment step pattern.

A Self-Centering Signal Tracking Algorithm

Since the height of a segment can vary and different sub-section LUTs will have to be used for each height h as h is varied on the fly. This will obviously result in a large number of LUTs as described above. To overcome this a spiral step pattern in a segment of variable height is generated by stepping multiple building block spectral columns as a group each with a self-centering algorithm.

Without the self-centering algorithm, a total of 208×7 LUTs are needed for the sub-sections alone. If the section LUT combination is taken into account, a total of 208×7×4 LUTs will be needed. Obviously, some relief in LUT memory requirement is needed.

With the self-centering algorithm, only seven LUTs are needed per spectral column for all h even when h is varied. The self-centering algorithm essentially overlaps all 208×7 LUTs into a single set of 7 with an overlapping addressing scheme. In addition, by further combining the common companding curves required for the 4 sections into one common set of curves, only a single overlapped self-centering LUT of size ~0.5K bytes will be needed to implement the optimized 4/7 companding algorithm!

The building block approach with a self-centering, 4/7 companding implementation can also support a regular spiral with a global height or an irregular spiral width different heights for individual spectral columns.

By virtue of the self-centering capability, the 4/7 companding approach therefore can be used to implement a data adaptive algorithm that tracks the signal strength or spot size of an optical signal as the height or width of the spots size varies. Note that the spot size is always centered on the spatial dispersion axis, making it easy for data adaptive thresholding of the signal strength.

SUMMARY

Segment processing implementation utilizes a building block with a self-centering algorithm and a 4/7 companding algorithm for high-speed 32-bit implementation. The building block for a variable height and width segment is a single spectral column (segment width=1) of maximum height Hmax.

The self-centering and 4/7 companding implementation of a spectral column only requires a simple computation for which of the 4 sections that a spectral column step pattern falls under. This is followed by 7 table-lookup operations for the 7 sub-sections and a re-combination of the 32-bit sub-vectors into a single 208-pixel vector representing the step pattern. Using this methodology, a 208-pixel step pattern for a single spectral column can be generated in ~30 DSP clocks with the Texas Instruments 320c5416 DSP, for example 200 ns (nanosecond) per spectral column. Faster DSPs can be used for higher speed operations.

The algorithm is designed for a general segment of variable height and width. There is no limit on Hmax and Wmax although the hardware used may impose some upper limits. Larger segments are build by combining a number of spectral columns as build blocks. By noting the relationship of a segment step number to the step numbers of its constituent spectral columns, the step numbers required for the constituent spectral columns can be individually computed. These individual step numbers are then used for step pattern generation for the constituent spectral columns (see later description of the Double-Crescent segment algorithm).

A data adaptive algorithm that tracks the signal strength or spot size of an optical signal as the height or width of the spots size varies can easily be implemented since the spot size is always centered on the spatial dispersion axis for data adaptive thresholding of the signal strength.

Segment processing algorithms can generate attenuation step patterns which result in DMD micromirrors being turned ON/OFF from outside-in or inside-out. Step pattern generation may specify X center mirrors to be always ON. Adjacent segments can be isolated or overlapped (resolved/unresolved λ's) as shown in FIG. 6.

A Self-Centering 4/7 Companding LUT for Hmax=208

The following code implements a self-centering 4/7 companding lookup table for a maximum row size of 208 rows:

extern unsigned long right_pattern1 [72]=

```
{
    0x00010000L, 0x00010000L, 0x00030000L, 0x00030000L,
    0x00070000L, 0x00070000L, 0x000f0000L, 0x000f0000L,
    0x001f0000L, 0x001f0000L, 0x003f0000L, 0x003f0000L,
    0x007f0000L, 0x007f0000L, 0x00ff0000L, 0x00ff0000L,
    0x01ff0000L, 0x01ff0000L, 0x03ff0000L, 0x03ff0000L,
    0x07ff0000L, 0x07ff0000L, 0x0fff0000L, 0x0fff0000L,
    0x1fff0000L, 0x1fff0000L, 0x3fff0000L, 0x3fff0000L,
    0x7fff0000L, 0x7fff0000L, 0xffff0000L, 0xffff0000L,
    0xffff0001L, 0xffff0001L, 0xffff0003L, 0xffff0003L,
    0xffff0007L, 0xffff0007L, 0xffff000fL, 0xffff000fL,
    0xffff001fL, 0xffff001fL, 0xffff003fL, 0xffff003fL,
    0xffff007fL, 0xffff007fL, 0xffff00ffL, 0xffff00ffL,
    0xffff01ffL, 0xffff01ffL, 0xffff03ffL, 0xffff03ffL,
    0xffff07ffL, 0xffff07ffL, 0xffff0fffL, 0xffff0fffL,
    0xffff1fffL, 0xffff1fffL, 0xffff3fffL, 0xffff3fffL,
    0xffff7fffL, 0xffff7fffL, 0xffffffffL, 0xffffffffL,
    0xffffffffL, 0xffffffffL, 0xffffffffL, 0xffffffffL,
    0xffffffffL, 0xffffffffL, 0xffffffffL, 0xffffffffL
};
``` extern unsigned long left_pattern1[73]=

```
{
    0x00000000L,
    0x00008000L, 0x00008000L, 0x0000c000L, 0x0000c000L,
    0x0000e000L, 0x0000e000L, 0x0000f000L, 0x0000f000L,
    0x0000f800L, 0x0000f800L, 0x0000fc00L, 0x0000fc00L,
    0x0000fe00L, 0x0000fe00L, 0x0000ff00L, 0x0000ff00L,
    0x0000ff80L, 0x0000ff80L, 0x0000ffc0L, 0x0000ffc0L,
    0x0000ffe0L, 0x0000ffe0L, 0x0000fff0L, 0x0000fff0L,
    0x0000fff8L, 0x0000fff8L, 0x0000fffcL, 0x0000fffcL,
    0x0000fffeL, 0x0000fffeL, 0x0000ffffL, 0x0000ffffL,
    0x8000ffffL, 0x8000ffffL, 0xc000ffffL, 0xc000ffffL,
    0xe000ffffL, 0xe000ffffL, 0xf000ffffL, 0xf000ffffL,
    0xf800ffffL, 0xf800ffffL, 0xfc00ffffL, 0xfc00ffffL,
    0xfe00ffffL, 0xfe00ffffL, 0xff00ffffL, 0xff00ffffL,
    0xff80ffffL, 0xff80ffffL, 0xffc0ffffL, 0xffc0ffffL,
    0xffe0ffffL, 0xffe0ffffL, 0xfff0ffffL, 0xfff0ffffL,
    0xfff8ffffL, 0xfff8ffffL, 0xfffcffffL, 0xfffcffffL
    0xfffeffffL, 0xfffeffffL, 0xffffffffL, 0xffffffffL,
    0xffffffffL, 0xffffffffL, 0xffffffffL, 0xffffffffL,
    0xffffffffL, 0xffffffffL, 0xffffffffL, 0xffffffffL
};
``` extern unsigned long center_pattern1[8]=

```
{
    //0x00080000L, 0x10080000L, 0x100c0000L, 0x300c0000L,
    //0x300e0000L, 0x700e0000L, 0x700f0000L, 0xf00f0000L
    0x10000000L, 0x10080000L, 0x30080000L, 0x300c0000L,
    0x700c0000L, 0x700e0000L, 0xf00e0000L, 0xf00f0000L
};
```

LUTs for Right-Segment and Left-Segment Dither-Maps

The following code implements a lookup table for right and left segment dither maps: extern unsigned int left_dither[17]=

```
{
    0x0000,
    0x0001, 0x0003, 0x0007, 0x000f,
    0x001f, 0x003f, 0x007f, 0x00ff,
    0x01ff, 0x03ff, 0x07ff, 0x0fff,
    0x1fff, 0x3fff, 0x7fff, 0xffff
};
``` extern unsigned int right_dither[17]=

```
{
    0x0000,
    0x8000, 0xc000, 0xe000, 0xf000,
    0xf800, 0xfc00, 0xfe00, 0xff00,
    0xff80, 0xffc0, 0xffe0, 0xfff0,
    0xfff8, 0xfffc, 0xfffe, 0xffff
};
```

A Double-Crescent Optical Segment

Figure 20:
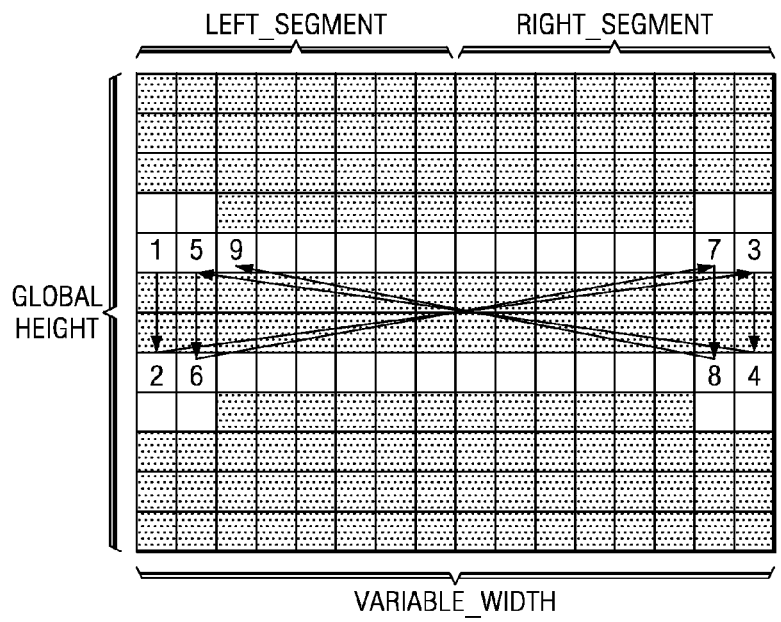
FIG. 20 is an illustration of a double-crescent segment.

A Double-Crescent segment pattern, shown in FIG. 20, is made up of the left and right segments of global height and variable width (width can be set to global if needed). The left and right segments can have an odd or even number of spectral columns the global height of which can also be an odd or even number of pixels (micromirrors).

The Double-Crescent algorithm implementation calls for the individual step patterns of the constituent spectral columns for the left and right segments to be generated in accordance to a relationship between the Double-Crescent segment step number and those of the single spectral column steps.

The relationship of a Double-Crescent segment step number to the step numbers of its constituent single spectral columns is shown in the following C code for the Double-Crescent algorithm.

A Double-Crescent Segment Algorithm

A group of indices required for generating the Double-Crescent segment from its constituent spectral columns.

The indices have to be computed for the global height of a spectral column being odd or even.

Computing the left and right segment indices then generates a Double-Crescent segment pattern.

Figure 21:
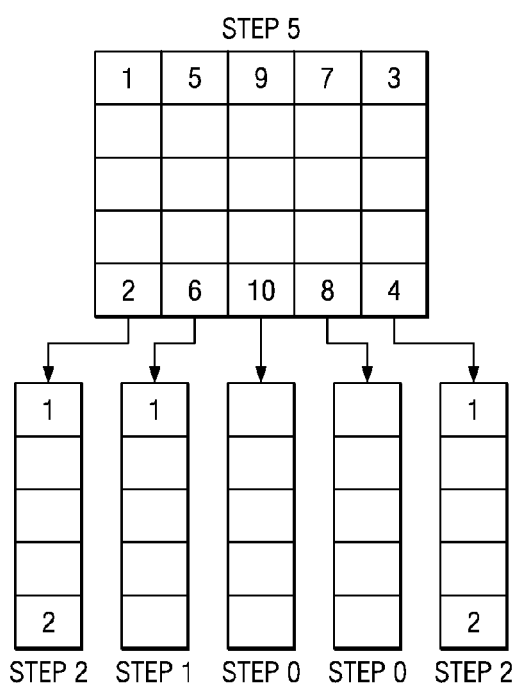
FIG. 21 is an illustration of various steps in the double crescent algorithm.

FIG. 21 shows the case where the global height of a spectral column is odd and the segment width happens to be an odd number of spectral columns as well. In this case, the left segment is made up of 3 spectral columns of 5 pixel each and the right segment is made up of 2 columns.

The index STEP_INDEX controls the number of "full" rows where all of its pixel or micromirrors are turned "OFF" (or "ON") as required by the double-Crescent segment step pattern.

The index STEP_MODULUS controls the number of "OFF" (or "ON") pixels or micromirrors in a partial row as required by the double-Crescent segment step pattern.

When the global height is odd, two rows of pixels will overlap as the double-Crescent closes in to its center step.

The C code below computes all the indices required for the generation of a 5×5 segment step which is made up of 5 spectral columns of height 5. The C function called is for an odd global height.

The segment step number 5 is then used to compute the required step numbers of the individual spectral columns in the left and right segments which made up the segment pattern.

In this example, segment step 5 requires the following to be generated:

Step 2 pattern to be generated in spectral column 1 of the left segment

Step 1 pattern to be generated in spectral column 2 of the left segment

Step 0 pattern to be generated in spectral column 3 of the left segment

Step 0 pattern to be generated in spectral column 1 of the right segment Step 2 pattern to be generated in spectral column 2 of the right segment The following C code computes the step numbers of the spectral columns based of the segment step number. The C functions called also generate the step pattern and write the pattern in memory.

create_odd_segment_map(int step_n, unsigned long *spmirror)

```
{
    int i;
    //unsigned long *spmirror;
    /* Calculate step_index and modulus */
    if (step_n != 0)
    {
        STEP_INDEX = (unsigned int)(step_n-1)/(2*width);
        STEP_MODULUS = (unsigned int)(step_n-1)%(2*width);
        if(STEP_INDEX == global_height/2)
        {
            STEP_MODULUS = STEP_MODULUS*2;
        }
    }
    else
    {
        STEP_INDEX = 0;
        STEP_MODULUS = -1;
    }
    /* Calculate segment_indices */
    if ((width & 1) == 1)
    {
        left_segment = (width>>1) + 1;
    }
    else
    {
        left_segment = (width>>1);
    }
    right_segment = (width>>1);
    /* Process left-segment and right-segment segment spectral columns */
    for (i = 0; i < left_segment; i++)
    {
        if ((STEP_MODULUS - i*4) < 0)
        {
            create_step_n_cw_map((STEP_INDEX*2), spmirror);
        }
        else if ((STEP_MODULUS - i*4) == 0)
        {
            create_step_n_cw_map((STEP_INDEX*2 + 1), spmirror);
        }
        else if ((STEP_MODULUS - i*4) >= 1)
        {
            create_step_n_cw_map((STEP_INDEX*2 + 2), spmirror);
        }
        spmirror = spmirror+7;
    }
    for (i = right_segment; i > 0 ; i--)
    {
        if ((STEP_MODULUS - (i-1)*4 - 2) < 0)
        {
            create_step_n_cw_map((STEP_INDEX*2), spmirror);
        }
        else if ((STEP_MODULUS - (i-1)*4 - 2) == 0)
        {
            create_step_n_cw_map((STEP_INDEX*2 + 1), spmirror);
        }
        else if ((STEP_MODULUS - (i-1)*4 - 2) >= 1)
        {
            create_step_n_cw_map((STEP_INDEX*2 + 2), spmirror);
        }
        spmirror = spmirror+7;
    }
    return;
}
```

In the above C code, the index STEP_INDEX requires a divide operation to be computed. The C code is written as such to invoke a high-speed divide from the DSP compiler assembly output. This assembly code also represents a few DSP assembly instructions invoked with a hardware repeat loop.

In the above C code, the index STEP_MODULUS requires a modulo operation to be computed. The C code is written as such to invoke a high-speed divide from the DSP compiler assembly output. This assembly code also represents a few DSP assembly instructions invoked with a hardware repeat loop.

Figure 22:
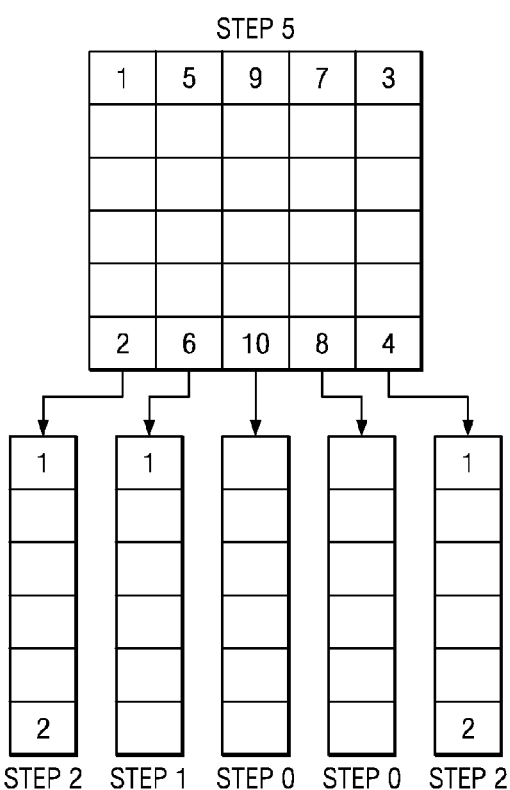
FIG. 22 is an illustration of various steps in the double crescent algorithm.

FIG. 22 shows the case where the global height of a spectral column is even and the segment width happens to be an odd number of spectral columns as well. In this case, the left segment is made up of 3 spectral columns of 5 pixel each and the right segment is made up of 2 columns.

The index STEP_INDEX controls the number of "full" rows where all of its pixels or micromirrors are turned "OFF" (or "ON") as required by the Double-Crescent segment step pattern.

The index STEP_MODULUS controls the number of "OFF" (or "ON") pixels or micromirrors in a partial row as required by the Double-Crescent segment step pattern.

When the global height is even, no two rows of pixels will overlap as the Double-Crescent closes in to its center step.

The C code below computes all the indices required for the generation of a 6×5 segment step which is made up of 5 spectral columns of height 6. The C function called is for an even global height.

The segment step number 5 is then used to compute the required step numbers of the individual spectral columns in the left and right segments which made up the segment pattern.

In this example, segment step 5 requires the following to be generated:
  Step 2 pattern to be generated in spectral column 1 of the left segment
  Step 1 pattern to be generated in spectral column 2 of the left segment
  Step 0 pattern to be generated in spectral column 3 of the left segment
  Step 0 pattern to be generated in spectral column 1 of the right segment
  Step 2 pattern to be generated in spectral column 2 of the right segment The following C code computes the step numbers of the spectral columns based of the segment step number. The C functions called also generate the step pattern and write the pattern in memory.

create_even_segment₁₃_map(int step_n, unsigned long *spmirror)

```
{
    int i;
    //unsigned long *spmirror;
    /* Calculate step_index and modulus */
    if (step_n != 0)
    {
        STEP_INDEX = (unsigned int)(step_n-1)/(2*width);
        STEP_MODULUS = (unsigned int)(step_n-1)%(2*width);
    }
    else
    {
        STEP_INDEX = 0;
        STEP_MODULUS = -1;
    }
    /* Calculate segment_indices */
    if ((width & 1) == 1)
    {
        left_segment = (width>>1) + 1;
    }
    else
    {
        left_segment = (width>>1);
    }
    right_segment = (width>>1);
    /* Process left-segment and right-segment spectral columns */
    for (i = 0; i < left_segment; i++)
    {
        if ((STEP_MODULUS - i*4) < 0)
        {
            create_step_n_cw_map((STEP_INDEX*2), spmirror);
        }
        else if ((STEP_MODULUS - i*4) == 0)
        {
            create_step_n_cw_map((STEP_INDEX*2 + 1), spmirror);
        }
        else if ((STEP_MODULUS - i*4) >= 1)
        {
            create_step_n_cw_map((STEP_INDEX*2 + 2), spmirror);
        }
        spmirror = spmirror+7;
    }
    for (i = right_segment; i > 0 ; i--)
    {
        if ((STEP_MODULUS - (i-1)*4 - 2) < 0)
        {
            create_step_n_cw_map((STEP_INDEX*2), spmirror);
        }
        else if ((STEP_MODULUS - (i-1)*4 - 2) == 0)
        {
            create_step_n_cw_map((STEP_INDEX*2 + 1), spmirror);
        }
        else if ((STEP_MODULUS - (i-1)*4 - 2) >= 1)
        {
            create_step_n_cw_map((STEP_INDEX*2 + 2), spmirror);
        }
        spmirror = spmirror+7;
    }
    return;
}
```

Variable Height & Width

The C code below is used to generate Double-Crescent patterns of the variable width and height segments whose widths and heights can be individually varied.

The C functions called also takes call of the fact that the global height of the spectral columns can be an odd or even number of pixels (micromirrors).

The self-centering algorithm is embedded in the C function call parameter. A dither-map for a spectral segment is built one spectral column at a time until the map for all spectral columns are complete. Each dither-map is "filled" from both ends of a spectral column towards the center of the spectral column depending on the indices described below.

Variable height is achieved with a Dither-Map implementation. As previously discussed, each spectral column is packed in the DSP optical band memory. The following indices are calculated:

| | |
|---|---|
| dmd_ptr | points to the start of the DSP optical band memory. |
| col_start_ptr | points to the beginning of each spectral column. |
| col_end_ptr | points to the end of each spectral column. |
| SC_INDEX | controls the number of consecutive groups of 16 "OFF" (or "ON") pixels within each spectral column as required by the segment dither-map. |
| SC_MODULUS | controls the number of "OFF" (or "ON") pixels in a partial group of less than 16 pixels within each spectral column as required by the segment dither-map. |
| left_modulus | updates the SC_MODULUS depending on whether global height is odd or even. |
| right_modulus | is set as SC_MODULUS. |

In the C code below, the indices SC_INDEX and SC_MODULUS requires a divide and a modulo operation to be computed. These arithmetic operations can be written in assembly code which requires fewer instructions with a hardware repeat loop. This will result in higher speed execution.

```
/* C code implementation as follows */
/* Generate segment patterns for variable segment width */
for (i = 0; i < variable_width; i++)
{
    //create_segment_map(i, mirror_ptr);
    if ((global_height & 1) == 1)
    {
        create_odd_segment_map(step, mirror + seg_width_ptr*7);
    }
    else
    {
        create_even_segment_map(step, mirror + seg_width_ptr*7);
    }
}
/* Generate segment patterns for variable segment height*/
/* now generate dither map for variable height */
col_start_ptr = dmd_ptr + seg_width_ptr*14;
col_end_ptr = dmd_ptr + seg_width_ptr*14 + 13;
/* Calculate SC_index and modulus */
if (global_height > 200)
{
    global height = 200;
}
SC_INDEX = (unsigned int)(200 − (global_height))/32;
SC_MODULUS = ((unsigned int)(200 − (global_height))%32) >> 1;
/* Calculate self_center_indices */
if ((global_height & 1) == 1)
{
    left_modulus = SC_MODULUS + 1;
}
else
{
    left_modulus = SC_MODULUS;
}
right_modulus = SC_MODULUS;
for (j = 0; j < global_width; j++)
{
    /* do bottom of segment */
    for (i = 0; i < SC_INDEX; i++)
    {
        tempdata = left_dither[16]|(int)*col_start_ptr;
        *(col_start_ptr + i) = tempdata;
    }
    tempdata = left_dither[left_modulus]|(int)*(col_start_ptr + SC_INDEX);
    *(col_start_ptr + SC_INDEX) = tempdata;
    /* do top of segment */
    for (i = 0; i < SC_INDEX; i++)
    {
        tempdata = right_dither[16]|(int)*col_end_ptr;
        *(col_end_ptr − i) = tempdata;
    }
    tempdata = right_dither[right_modulus]|(int)*(col_end_ptr − SC_INDEX);
    *(col_end_ptr − SC_INDEX) = tempdata;
    /* increment start/end pointers */
    col_start_ptr = col_start_ptr + 14;
    col_end_ptr = col_end_ptr + 14;
}
```

Optical Mask Generation with Dither-Maps

In general, a Double-Crescent pattern generated with linear steps may not be ideal for coherent optical signal processing due to non-linearity in the system response and phase relationships of the individual micromirrors of the DMD. Consequently, some kind of random step pattern generation is required to yield the best phasor plot in terms of magnitude and phase for an optical filter implemented with segment processing of the spatially dispersed DWDM wavelengths.

Figure 23:
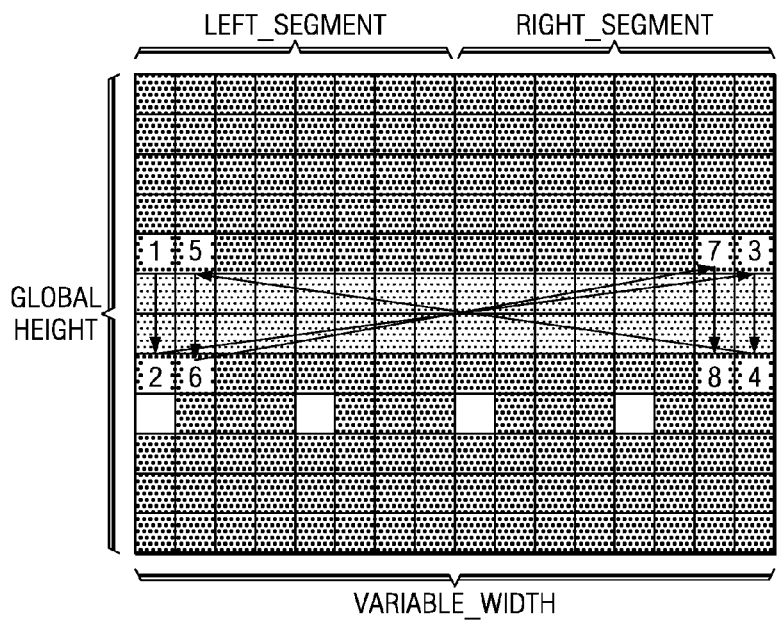
FIG. 23 is an illustration of an optical mask with a dither map.

One way of achieving this is to overlay the linear segment pattern with a dither-Map as shown in FIG. 23. The term dither-Map is equivalent to the usage of the term "dithering-map" in a previous filing. The dither-Map has pixels or micromirrors turned ON (or OFF depending on polarity) where phase is important in the segment step pattern. The dither-map acts as an optical mask that can be logically OR'ed (or AND'ed) with the segment step pattern during its generation. This additional step takes one logic operation and can therefore be implemented very quickly. Also, for simple polarity inversion of ON or OFF, the DSP also has compliment instruction to satisfy this requirement if needed.

When a segment pattern is OR'ed with a dither-map with specific ON overlay pixels (as shown in FIG. 23), the linear attenuation pattern (turning pixels OFF) is "punctuated" with pixels which are always ON. This forces the phasor map to change due to the interactions of the phase and magnitude functions of the individual micromirrors that act as tiny phasors. Alternatively, forcing certain micromirrors on the DMD to be always OFF can also generate a random pattern. ANDing a dither-map" with OFF pixels with a linear segment pattern achieves this condition. This forces optical "holes" in the segment pattern where light is not reflected.

Processing Linear and dB Steps

Figure 24:
FIG. 24 is a flow chart illustrating segment mapping.

It may be entirely possible that the above segment patterns of step_n sequencing will not produce linear steps in the filtering transfer function. Therefore, as shown in FIG. 24, a one-to-one mapping is necessary where a step_n in the segment pattern is mapped to another pattern step, for example logarithmic steps, with a non-linear relationship. For this mapping we can use table look-up. For steps in dB, one dB step may equal to many linear segment generated by the segment pattern algorithm. For this implementation, logarithmic segment steps are generated by first translating it to its corresponding linear step in the segment step sequence. This is done efficiently with a lookup table or computation. The equivalent linear step pattern is then generated for the dB step required.

Super-Step Pattern Generation:

Sometimes it is useful to produce a large step (super-step) which spans the entire width of an optical segment of width w and height h as shown in the shaded area below. For a global height of Hmax=208, there can be a number of super-steps each having a step size of $\Delta$ which ranges from 0 to 16 pixels in height.

Figure 25:
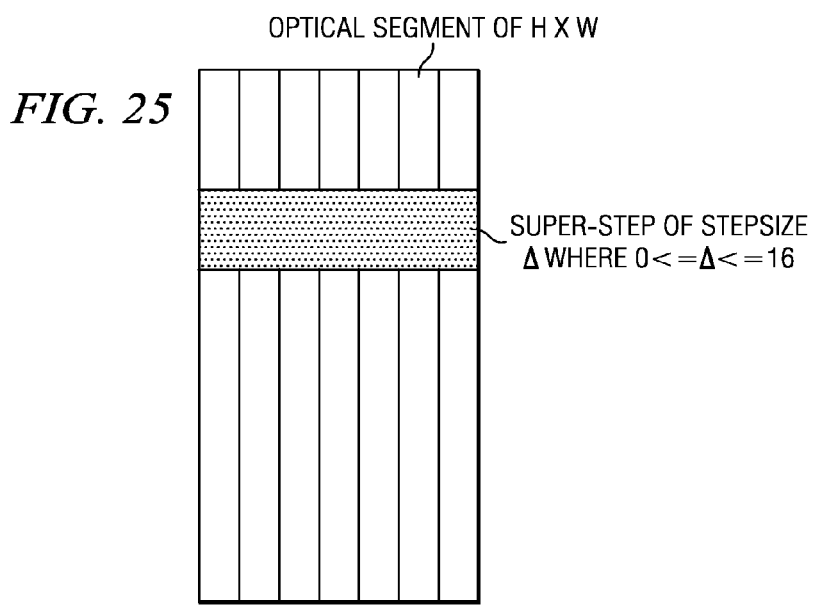
FIG. 25 is an illustration of a super-step.

Each super-step can be implemented with a suitable dither-map, with or without a dither pattern. When implemented without a dither pattern, all the micromirrors within each super-step is either turn ON or OFF depending on the optical design chosen or the application at hand. When implemented with a dither pattern (e.g. the periodic dither map shown in FIG. 25), further attenuation can be achieved for a larger dynamic range, extinction ratio or adjacent channel (i.e. optical segment) rejection for better signal to noise ratio and system performance.

/* C code implementation as follows */
The following indices are calculated:

| | |
|---|---|
| dmd_ptr | points to the start of the DSP optical band memory. |
| superstep_ptr | points to the beginning of each super-step column. |
| ss_index | controls the number of consecutive groups of 16 "OFF" (or "ON") pixels within each spectral column as required by the super-step dither-map. |
| ss_modulus | controls the number of "OFF" (or "ON") pixels in a partial group of less than 16 pixels within each spectral column as required by the super-step dither-map. |
| temp_index | computed as (ss_modulus/step_size) − 1. |
| ss_ptr | a pointer to ss_index. |
| mod_ptr | a pointer to ss_ptr + 1. |

In the C code below, the indices ss_index and ss_modulus requires a divide and a modulo operation to be computed. These arithmetic operations can be written in assembly code that requires fewer instructions with a hardware repeat loop. This will result in higher speed execution.

```
/* Calculate segment_indices */
if ((width & 1) == 1)
{
    left_segment = (width>>1) + 1;
}
else
{
    left_segment = (width>>1);
}
right_segment = (width>>1);
/* super step pattern generation function for segments with variable
widths */
/* and a global height of 208 and a step_size of ss */
/* now generate dither map for global_height = 208, step_sizes =
0->16*/
ss_index = (step * step_size)/16;
ss_modulus = (step * step_size)%16;
temp_index = (ss_modulus/step_size) − 1;
ss_ptr = ss_index;
mod_ptr = ss_ptr + 1;
superstep_ptr = dmd_ptr + seg_width_ptr*14;
for (i = 0; i < global_width; i++)
{
    for (j = 0; j < 14; j++)
    {
        *(superstep_ptr + j) = 0;
    }
    if (step == 0 || step > (208/step_size))
    {
        ;
    }
    else if (ss_index == 0)
    {
        if (step_size >= ss_modulus)
        {
            *(superstep_ptr) = left_dither[ss_modulus];
        }
        else
        {
            *(superstep_ptr) = left_dither[ss_modulus]
                & (~left_dither[temp_index * step_size]);
        }
    }
    else if (ss_index == 7)
    {
```

```
        ss_ptr = ss_index − 1;
        mod_ptr = ss_ptr + 1;
        if (step_size >= ss_modulus)
        {
            *(superstep_ptr + ss_ptr) = right_dither[step_size −
                ss_modulus];
            *(superstep_ptr + mod_ptr + 1) =
                left_dither[ss_modulus];
        }
        else
        {
            *(superstep_ptr + ss_ptr) = right_dither[0];
            *(superstep_ptr + mod_ptr + 1) =
                left_dither[ss_modulus]
                    & (~left_dither[ss_modulus − step_size]);
        }
    }
    else if (ss_index > 7)
    {
        ss_ptr = ss_index;
        mod_ptr = ss_ptr + 1;
        if (step_size >= ss_modulus)
        {
            *(superstep_ptr + ss_ptr) = right_dither[step_size −
                ss_modulus];
            *(superstep_ptr + mod_ptr) = left_dither[ss_modulus];
        }
        else
        {
            *(superstep_ptr + ss_ptr) = right_dither[0];
            *(superstep_ptr + mod_ptr) = left_dither[ss_modulus]
                & (~left_dither[ss_modulus − step_size]);
        }
    }
    else
    {
        ss_ptr = ss_index − 1;
        mod_ptr = ss_ptr + 1;
        if(step_size >= ss_modulus)
        {
            *(superstep_ptr + ss_ptr) = right_dither[step_size −
                ss_modulus];
            *(superstep_ptr + mod_ptr) = left_dither[ss_modulus];
        }
        else
        {
            *(superstep_ptr + ss_ptr) = right_dither[0];
            *(superstep_ptr + mod_ptr) = left_dither[ss_modulus]
                & (~left_dither[ss_modulus − step_size]);
        }
    }
    /* increment ptr */
    superstep_ptr = superstep_ptr + 14;
}
```

Thus, although there has been disclosed to this point a particular embodiment for dynamic pattern generation for optical signal processing and a method therefore, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims. In the following claims, only elements denoted by the words "means for" are intended to be interpreted as means plus function claims under 35 U.S.C. § 112, paragraph six.

What is claimed is:
1. A method of optical signal processing, comprising:
providing a micromirror array comprised of an array of micromirror elements;

generating a bit map representing the state of at least some of said micromirror elements, said generation step performed using a digital signal processor to implement a double crescent algorithm; and applying said bit map to said mirror array to influence the position of said mirror elements.

* * * * *